United States Patent [19]
Ohmori

[11] Patent Number: 5,404,342
[45] Date of Patent: Apr. 4, 1995

[54] MAGNETIC HEAD DEVICE FOR MAGNETO-OPTICAL DISC SYSTEM AND MAGNETIC HEAD DRIVING CIRCUIT

[75] Inventor: Takashi Ohmori, Tokyo, Japan

[73] Assignee: Sony Corporation, Japan

[21] Appl. No.: 2,726

[22] Filed: Jan. 11, 1993

[30] Foreign Application Priority Data

Jan. 16, 1992 [JP] Japan .................... 4-024373
Jan. 16, 1992 [JP] Japan .................... 4-024374

[51] Int. Cl.⁶ ............................................. G11B 5/03
[52] U.S. Cl. ........................................ 369/13; 360/114
[58] Field of Search ............ 369/13; 360/114, 46, 360/66, 123, 125, 102, 103, 59; 330/262, 264

[56] References Cited

U.S. PATENT DOCUMENTS

| | | | |
|---|---|---|---|
| 4,769,724 | 9/1988 | Kusunoki et al. | 360/66 |
| 4,937,802 | 6/1990 | Omori et al. | 369/13 |
| 4,979,158 | 12/1990 | Yoda | 369/13 |
| 5,220,467 | 6/1993 | Zucker | 360/66 |
| 5,229,902 | 7/1993 | Zucker et al. | 369/13 |
| 5,293,360 | 3/1994 | Hasegawa et al. | 369/13 |
| 5,305,294 | 4/1994 | Kime et al. | 369/13 |

FOREIGN PATENT DOCUMENTS 0312143 4/1989 European Pat. Off. .
1376083 12/1974 United Kingdom .

Primary Examiner—Georgia Y. Epps
Assistant Examiner—Tan Dinh
Attorney, Agent, or Firm—Ronald P. Kananen

[57] ABSTRACT

A magnetic head driving circuit for driving a magnetic head device adapted for recording information signals on a magneto-optical disc by applying a magnetic field to the magneto-optical disc is disclosed. The magnetic head driving circuit includes a pair of switching elements for performing a push-pull operation in accordance with input recording signals, a pair of rectifiers connected in series with each other between the switching elements, a magnetic field generating coil having one terminal connected to a junction line between the rectifying elements via a coupling capacitance and having its other terminal grounded. The magnetic field generating coil generates a magnetic field by being supplied with a driving current corresponding to the recording signals. An amplifier capacitor is connected in parallel with the magnetic field generating coil in an ac path for amplifying the driving current supplied to the magnetic field generating coil. With the above-described magnetic head driving circuit, the driving current supplied to the magnetic head generating coil may be amplified to increase the strength of the magnetic field generated by the magnetic field generating coil. A magnetic head device is also disclosed which includes a substrate provided integrally with a magnetic core about which the magnetic field generating coil is wound and with the above-mentioned driving circuit for simplifying the structure and reducing the size of the head device.

9 Claims, 14 Drawing Sheets

MAGNETIC HEAD DEVICE FOR MAGNETO-OPTICAL DISC SYSTEM AND MAGNETIC HEAD DRIVING CIRCUIT

BACKGROUND OF THE INVENTION

1. Field of the Invention

This invention relates to a magnetic head device employed in a magneto-optical disc system and a magnetic head driving circuit for driving and controlling the magnetic head device. More particularly, it relates to a magnetic head device employed for recording information signals on a magneto-optical disc and a magnetic head driving circuit for controlling the driving current driving the magnetic head device.

2. Description of Related Art

Proposed a disc recording apparatus is known which comprises an optical pickup device for radiating a light beam to a magneto-optical disc and for detecting the light returned from the magneto-optical disc A magnetic head device is arranged face the optical pickup device and applies external magnetic field to the magneto-optical disc. The magneto-optical disc is rotationally driven between the optical pickup device and the magnetic head device for recording information signals on the disc.

In the above-described disc the recording apparatus, recording of information signals on the magneto-optical disc is carried out by radiating a converged light beam from the optical pickup device on a signal recording layer of the magneto-optical disc for heating the recording layer. An external magnetic field is then applied by the magnetic head device on the heated portion of the signal recording layer for aligning the direction of magnetization of the heated portion with the direction of the applied external magnetic field.

Meanwhile, the magnetic head device employed in the abovedescribed disc recording apparatus comprises a magnetic field generating coil which is supplied with a driving current for generating a magnetic field and is controlled by a magnetic head driving circuit. The magnetic head driving circuit controls the driving current in accordance with information signals recorded on the magneto-optical disc and modulate the magnetic field generated by the magnetic field generating coil in accordance with the information signals.

The magnetic head device is controlled to follow the magneto-optical disc so that it is always spaced apart from the surface of the signal recording layer of the magneto-optical disc at a distance of approximately 100 $\mu$m to 200 $\mu$m. This movement is realized by providing a sheet of a uniform thickness on the surface of the signal recording layer and moving the magnetic head device on and in sliding contact with the sheet surface.

A magnetic head driving circuit as described in U.S. Pat. No. 4,937,802, has been proposed prior to the present invention.

The concrete example of the magnetic head driving circuit, proposed prior to the present invention, is hereinafter explained. A magnetic head driving circuit 114 comprises a plurality of field effect transistors (FETs) as switching elements, as shown in FIG. 1. The magnetic head driving circuit 114 is connected to a logic circuit 113 supplied with clock signals and recording signals which are the above-mentioned information signals to be recorded on the signal recording layer. The magnetic head driving circuit 114 comprises first to sixth FETs 115 to 120 having their gate terminals connected to the logic circuit 113 so as to be turned on and off by the logic circuit 113. The first and second FETs 115, 116 are P-channel FETs, while the third to sixth FETs 117 to 120 are N-channel FETs.

With the magnetic head driving circuit 114, a positive power source +V is connected to drain terminals of the first ad second FETs 115, 116. The first FET 115 has its source terminal connected to a source terminal of the third FET 117 and also to a drain terminal of the fifth FET 119 via a first diode 121. The second FET 116 has its source terminal connected to a source terminal of the fourth FET 118 and also connected to a drain terminal of the sixth FET 120 via a second diode 122. A magnetic field generating coil L is connected across the source terminal of the first FET 115 and the source terminal of the second FET 116.

The third and fourth FETs 117, 118 have their drain terminals connected to a negative power source −V, while the fifth and sixth FETs 119, 120 have their drain terminals connected to g round potential.

With the above-described magnetic head driving circuit 114, when the recording signal goes to a high (H) level, the first FET 115, which has been turned on when the recording signal is at a low "L" level, is turned off, while the second FET 116, which has been turned off when the recording signal is at a low "L" level, is turned on, as shown in a timing chart of FIG.2. At this time, the third FET 117 is turned on during a one-pulse period, based on the clock signals, after the recording signal has gone low. The fourth FET 118 is turned on in a pulsed fashion, based on the clock signals, during the period when the recording signal is at the H level, so as to follow up with the third FET 117.

With the above-described magnetic head driving circuit 114, when the recording signal goes to a low (L) level, the first FET 115, which has been turned off when the recording signal is at the high "H" level, is turned on, while the second FET 116, which has been turned on when the recording signal is at the high "H" level, is turned off. At this time, the fifth FET 119 is turned on during a one-pulse period, based on the clock signals, after the recording signal has gone low. The sixth FET 120 is turned on in a pulsed fashion, based on the clock signals, during the period when the recording signal is at the L level, so as to follow up with the fifth FET 119.

With the FETs 115 to 120 turned on and off in the controlled manner as described above, the voltage $V_A$, applied across the magnetic field generating coil L, is changed from +V to −V after the recording signal has gone high and during the time when the third FET 117 is in a turned-on state. Since then, the voltage $V_A$ is pulsated in such manner that it is zero and at +V when the fourth FET 118 is in the turned-on state and in the turned-off state, respectively. When the recording signal goes low, the voltage $V_A$ is maintained at +V.

With the voltage $V_A$ across the magnetic field generating coil L controlled in the above-described manner, a current $I_H$ flowing through the magnetic field generating coil L is maintained at a substantially constant negative value as long as the recording signal is at an H level, and is maintained at a substantially constant positive value as long as the recording signal is at an L level.

Meanwhile, it is difficult to reduce the above-described magnetic head driving circuit in size because of the large number of components making up the driving circuit. Furthermore, it is necessary to employ a complicated control circuit for controlling the magnetic head driving circuit because of the large number of elements turned on and off in controlled manner.

The complicated magnetic head driving circuit is employed in the prior art driving circuit because it has been necessary to increase the magnetic field generated by the magnetic field generating coil L to a sufficiently high level. That is, in view of the characteristics of the signal recording layer of the magneto-optical disc, it has been necessary with the prior art driving circuit to apply a sufficiently large magnetic field even if the magnetic head device is spaced apart from the signal recording layer by a distance on the order of 400 μm.

OBJECTS AND SUMMARY OF THE INVENTION

It is an object of the present invention to provide a novel magnetic head device free from the inconveniences inherent in the previously proposed magnetic head driving circuit, and a driving circuit for driving the magnetic head device.

It is another object of the present invention to provide a magnetic head controlling circuit capable of generating a sufficiently large magnetic field while simplifying the construction of a magnetic head device driven by the driving circuit.

It is yet another object of the present invention to provide a magnetic head device in which a driving circuit is incorporated for simplifying the construction and reducing the size of the head device.

According to the present invention, a magnetic head driving circuit for driving a magnetic head device adapted for recording information signals on a magneto-optical disc by applying a magnetic field thereto, comprises a pair of switching elements for performing a push-pull operation accordance with input recording signals, a pair of rectifiers connected in series with each other between the switching elements, and a magnetic field generating coil having its one terminal connected to a junction line between the rectifying elements via a coupling capacitor and having its other terminal grounded. The magnetic field generates coil generating a magnetic field by being supplied with a driving current corresponding to the recording signals. An amplifier capacitor is connected in parallel with said magnetic field generating coil in an ac path for amplifying the driving current supplied to the magnetic field generating coil.

With the above-described magnetic head driving circuit, the capacitor for amplifying the driving current, connected in parallel with the magnetic field generating coil in an ac path, stores the energy of the recording signals and releases the energy on an inversion of the recording signals. The capacitor amplifies the driving current supplied to the magnetic field generating coil and augments the magnetic field generated by the magnetic field generating coil.

According to the present invention, a magnetic head device for recording information signals on a magneto-optical disc by application of a magnetic field on a signal recording layer thereof, comprises a magnetic core, a substrate for supporting the magnetic core, a magnetic field generating coil wound about the magnetic core and supplied with a driving current for generating a magnetic field for generating a magnetic field, and a driving circuit provided integrally with the magnetic field generating coil on the substrate. The driving circuit includes a switching element supplied with input recording signals and adapted for being turned on and off in accordance with the recording signals. A rectifier is connected in series with the switching element and an amplifying capacitor is connected in parallel with the magnetic field generating coil in an ac path and is adapted for amplifying the driving current supplied to said magnetic field generating coil. The driving circuit supplies a driving current corresponding to the recording signals to the magnetic field generating coil.

With the above-described magnetic head device, since the magnetic core about which the magnetic field generating coil is wound and the magnetic head driving circuit for supplying the driving current corresponding to the recording signals to the magnetic field generating coil are both supported on the substrate, the disc recording apparatus arranged using the magnetic head device may be simplified in structure and reduced in size.

Other objects and advantages of the present invention will become clear from the following description of the preferred embodiments and the claims.

DETAILED DESCRIPTION OF THE PREFERRED EMBODIMENTS

Figure 1:
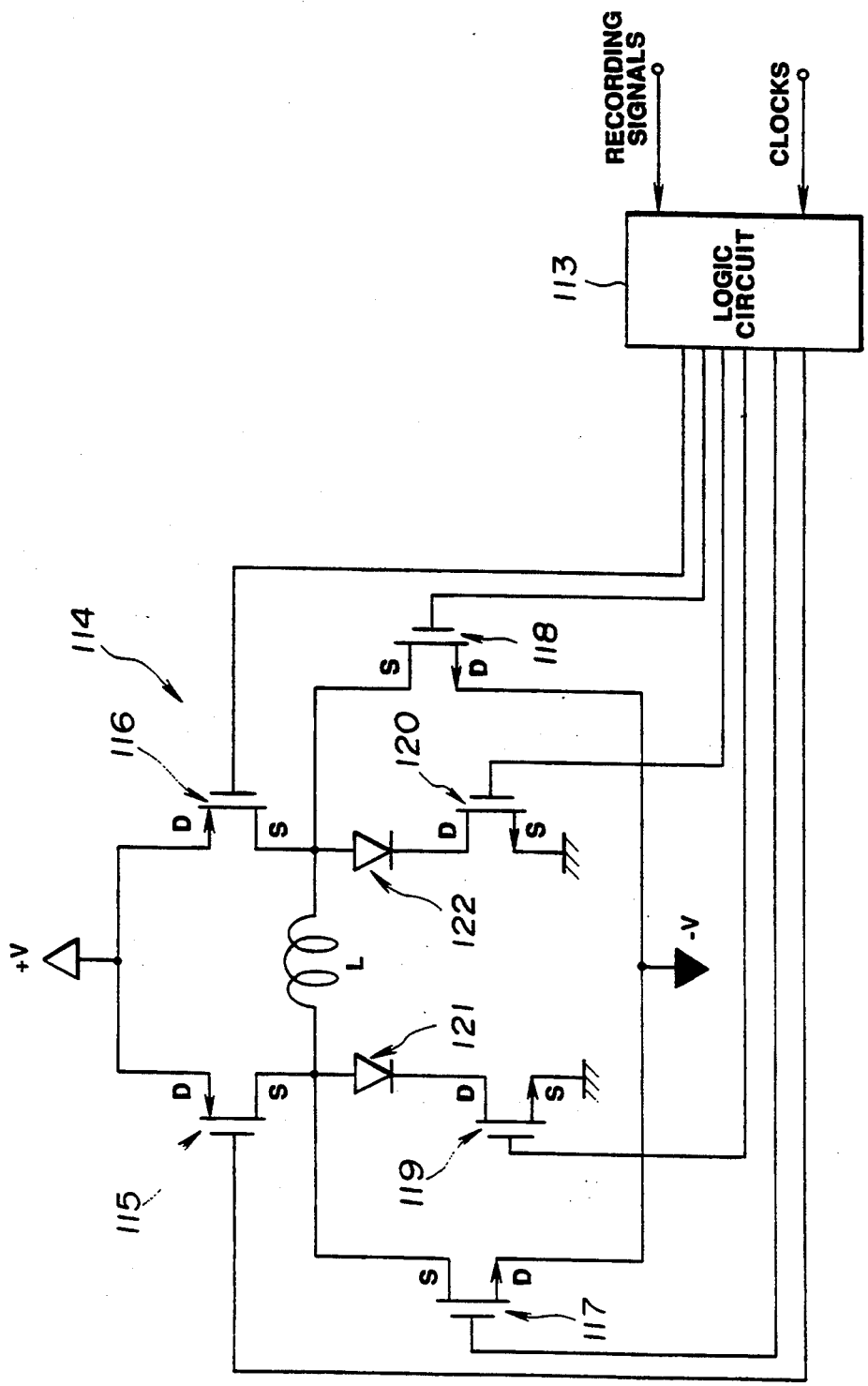
FIG. 1 is a circuit diagram showing a constitution of a conventional magnetic head driving circuit.
Figure 2:
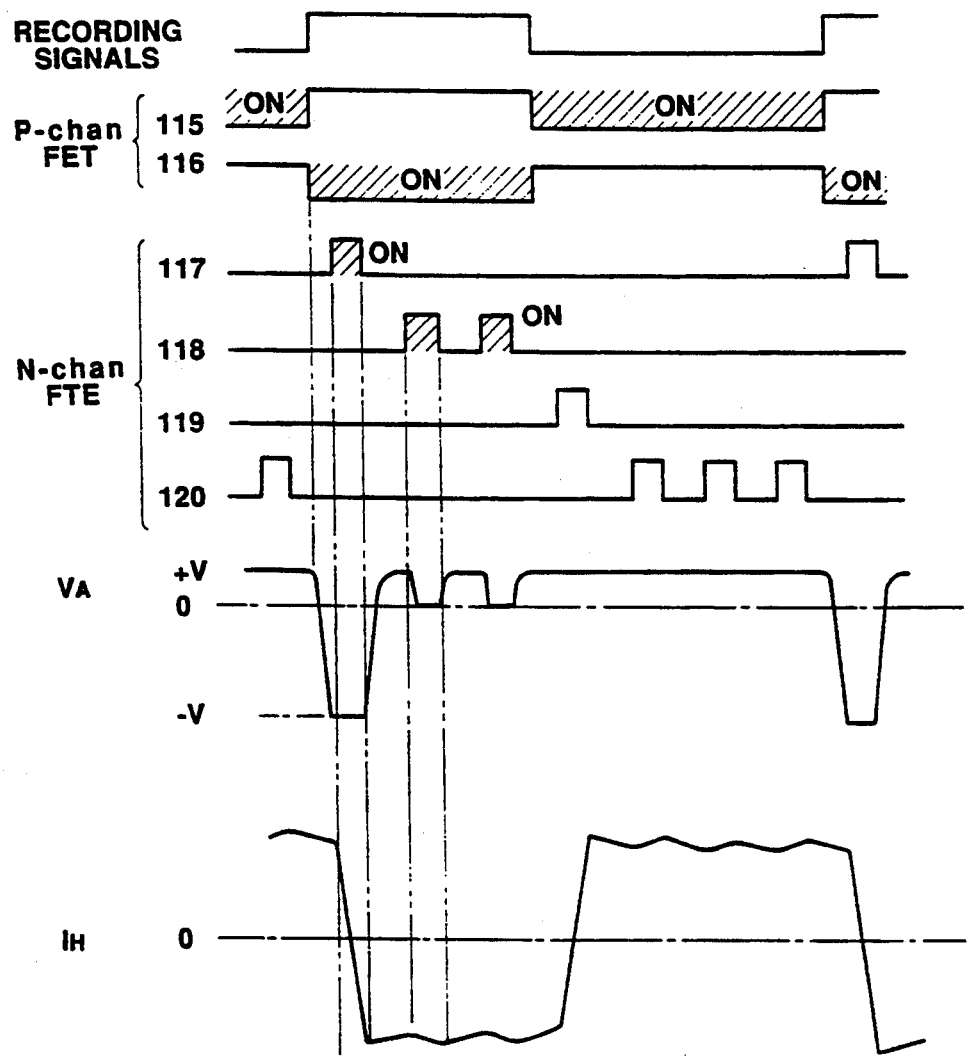
FIG. 2 is a timing chart for illustrating the relation between recording signals, electrical voltages applied across a magnetic field generating coil and the current flowing through the coil in the magnetic head driving circuit shown in FIG. 1.

Referring to the drawings, certain preferred embodiments of the present invention will be explained in detail.

Figure 3:
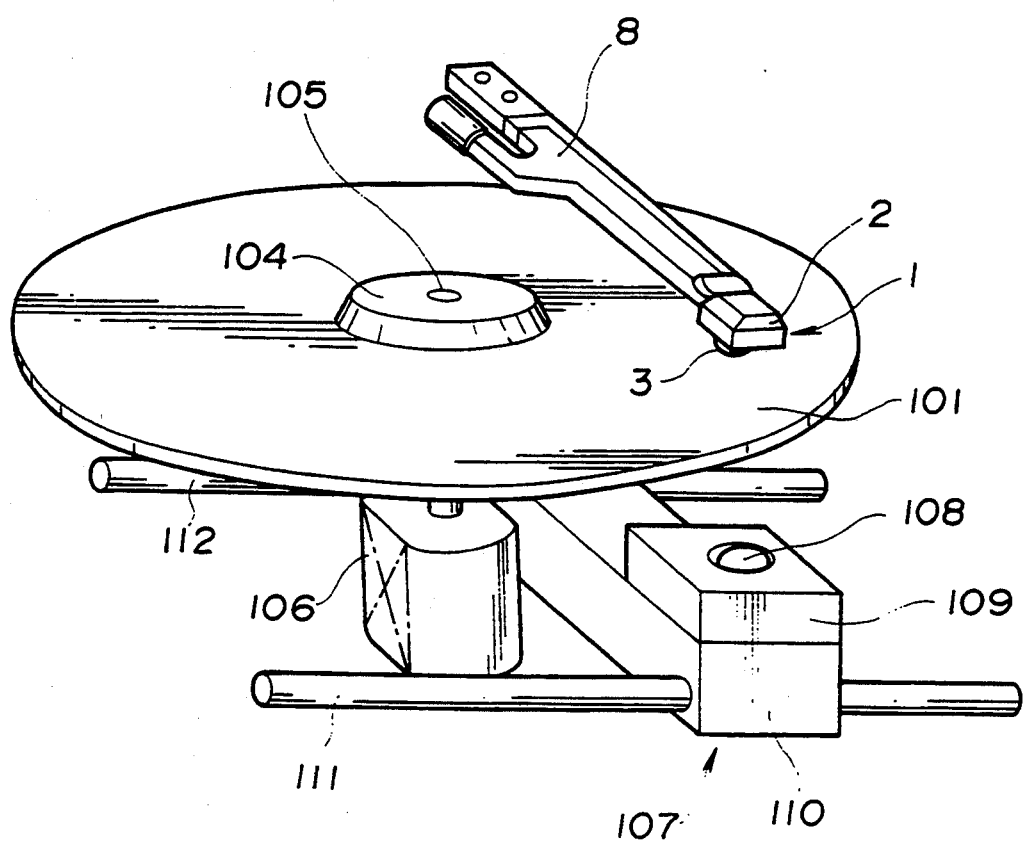
FIG. 3 is a perspective view showing the constitution of essential parts of a recording apparatus employing the magnetic head device according to the present invention.

A magnetic head driving circuit according to the present invention is applied to a recording apparatus in which an optical pickup device 107 and a magnetic head device 1 are arranged with a magneto-optical disc 101 in-between for recording information signals on the magneto-optical disc 101, as shown in FIG. 3.

Figure 4:
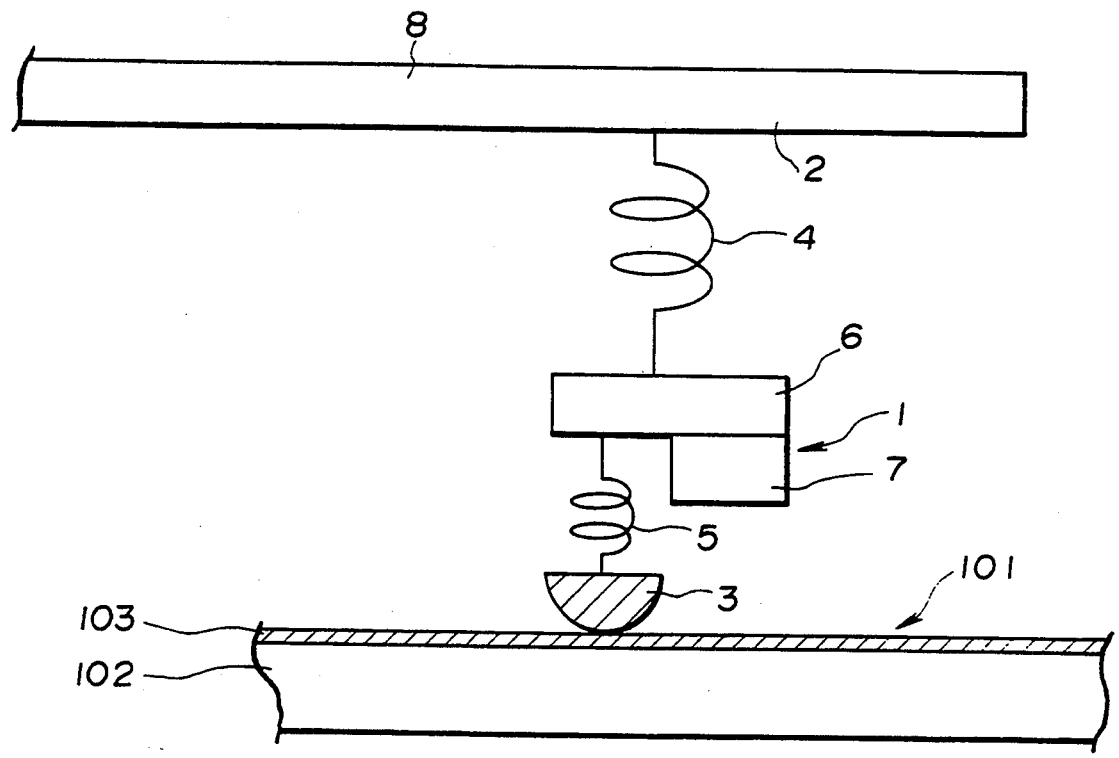
FIG. 4 is an enlarged side view showing an equivalent constitution of the magnetic head device of the present, invention.

The magneto-optical disc 101 comprises a disc substrate 102 and a signal recording layer 103 deposited on the disc substrate 102, as shown in FIG. 4. When the information signals are to be recorded by the recording apparatus, the magneto-optical disc 101 is rotationally driven by a spindle motor 106 at a position between the optical pickup device 107 and the magnetic head device 1, while a converged light beam is radiated on the signal recording layer 103 through the light-transmitting disc substrate 102 by the optical pickup device 107, at the same time that an external magnetic field is applied to the signal recording layer 103 by the magnetic head device 1.

When the signal recording layer 103 of the magneto-optical disc 101 is heated in this manner by radiation of the light beam from the optical pickup device 107, while it is supplied with the external magnetic field from the magnetic head device 1, the coercive force of the heated portion is lost and the direction of magnetization of the heated portion is aligned with the direction of the external magnetic field.

The magneto-optical disc 101 is supported via a chucking unit 104 by a driving shaft 105 of the spindle motor 106.

The optical pickup device 107, radiating the light beam to the magneto-optical disc, is made up of an optical block 110 and an object lens driving unit 109. The optical block 110 has enclosed therein a light source, such as a laser diode, an optical device for guiding the light beam radiated from the light source and a photodetector for receiving the return light beam reflected back from the magneto-optical disc 101. The object lens driving unit 109 supports an object lens 108, adapted for converging the light beam from the light source, incident thereon, so that the object lens may be moved in a direction along its optical axis and in a direction normal to the optical axis. The object lens driving unit 109 controls the object lens 108 so that the object lens 108 is moved to follow eccentricities or deviations from horizontal of the magneto-optical disc 101 for perpetually locating the point of convergence of the light beam by the object lens 108 on the surface of the signal recording layer 103 of the magneto-optical disc 101.

On the other hand, the optical pickup device 107 is movably supported by a pal r of guide; shafts 111, 112 for causing the object lens 108 to face the magneto-optical disc 101, supported by a chucking unit 104, across the inner and outer peripheries of the disc 101.

The magnetic head device 1, adapted for applying the external magnetic field to the magneto-optical disc 101, includes a magnetic field generating coil L, which is fed with a driving current $I_H$ controlled by the magnetic head driving circuit, for generating the external magnetic field. The magnetic head device 1 is made up of a head support 6 and a circuit part 7 mounted on the head support, as shown in FIG. 4. The head support 6 is mounted via a compression spring 4 on a distal end 2 of a supporting arm 8 mounted facing the magneto-optical disc 101 for movement between the inner and outer rims of the disc. The magnetic head device 1 is pressed against the magneto-optical disc 101 with a predetermined pressure by the compression spring 4. A slider 3 is mounted via a damper spring 5 on the head support 6. The slider 3 is kept in sliding contact with the surface of the magneto-optical disc 101 on which the signal recording layer 103 is formed. By the damper spring 5, the magnetic head device 1 is floated by a distance on the order of 100 μm from the surface of the magnetic head device 1 on which the signal recording layer 103 is formed.

Figure 5:
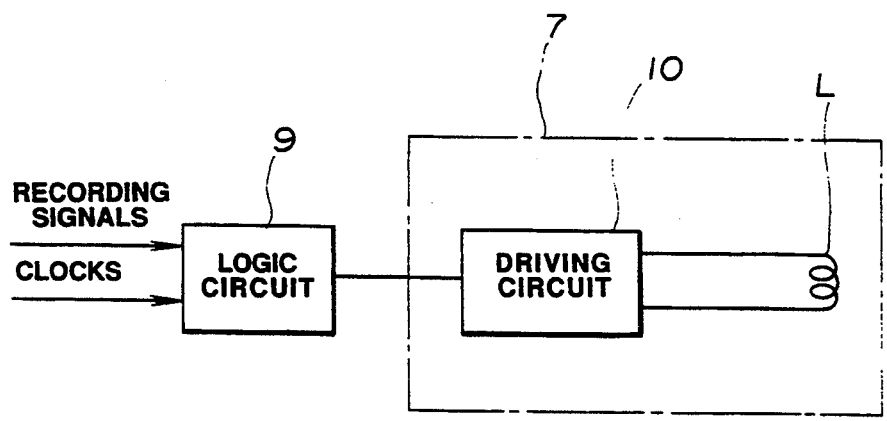
FIG. 5 is a block circuit diagram of a magnetic head device inclusive of a magnetic head driving circuit according to the present invention.

The circuit part 7 is made up a magnetic head generating coil L and a driving circuit 10 which is a magnetic head driving circuit connected to the coil L, as shown in FIG. 5. The driving circuit 10 is controlled by a logic circuit 9 supplied with clock signals and recording signals. The recording signals are the information signals recorded on the magneto-optical disc 101, for controlling the driving current $T_H$. For modulating the external magnetic field. Thus the magnetic head device 1 causes the recording signals to be recorded on the magneto-optical disc 101 in accordance with the so-called magnetic field modulation system.

Figure 6:
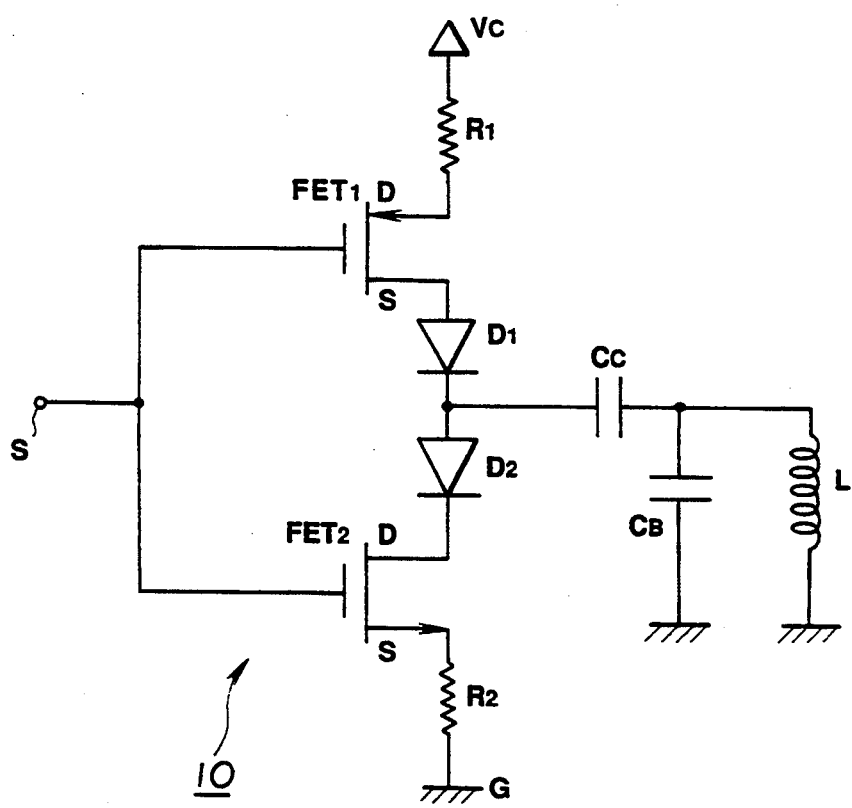
FIG. 6 is a circuit diagram showing a constitution of a magnetic head driving circuit according to the present invention.

The driving circuit 10 has first and second switching elements $FET_1$, $FET_2$, having their gate terminals connected to an input terminal S supplied with the input recording signals, as shown in FIG. 6. These switching elements $FET_1$, $FET_2$ are paired and perform a push-pull operation in accordance with the recording signals. That is, the first and second switching elements $FET_1$, $FET_2$ are field effect transistors, with the first switching element $FET_1$ being a P-channel FET and the second switching element $FET_2$ being an N-channel FET. The first switching element $FET_1$ is turned off and on when the recording signal is at the H and L levels, respectively. Conversely, the second switching element $FET_2$ is turned on and off when the recording signal is at the H and L levels, respectively.

A power source $V_c$ is connected to a drain terminal of the first switching element $FET_1$ via a first limiting resistor $R_1$. The first switching element $FET_1$ has its source terminal connected to a drain terminal of the second switching element $FET_2$ via first and second diodes $D_1$, $D_2$ forming a rectifier. The first and second diodes $D_1$, $D_2$ are connected in series with each other, with the direction from the source terminal of the first switching element $FET_1$ to the drain terminal of the second $FET_2$ being the forward direction.

The second switching element $FET_2$ has its source terminal grounded via a second limiting resistor $R_2$.

With the above-described driving circuit 107 the magnetic field generating coil L has its one end connected to a junction between the first diode $D_1$ and the second diode $D_2$ via a coupling capacitor $C_c$, while having its other end grounded.

Figure 7:
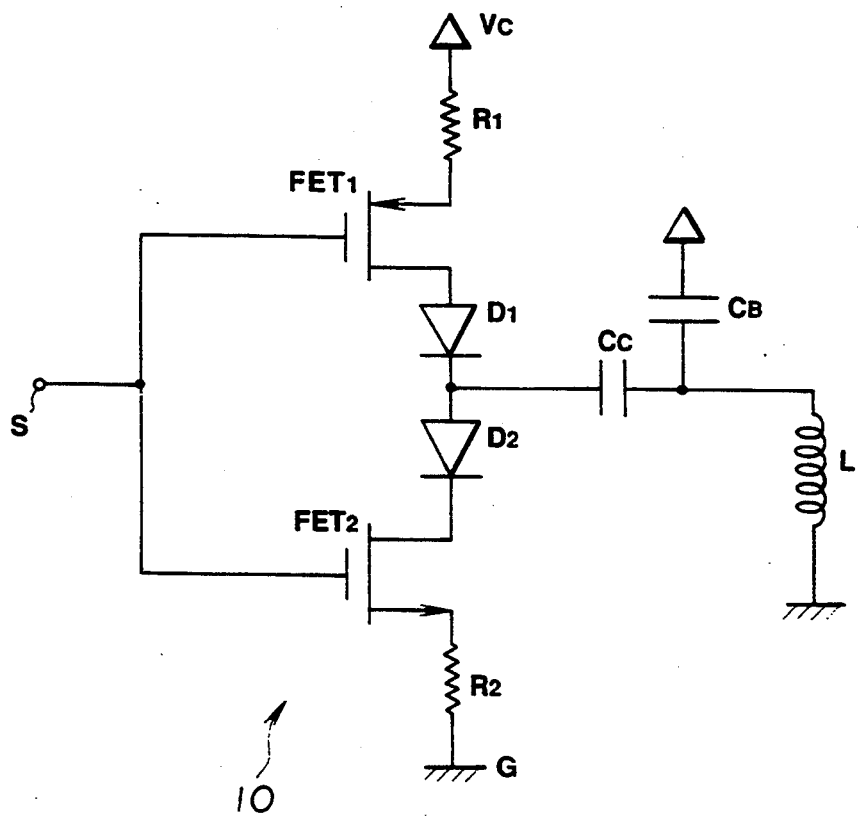
FIG. 7 is a circuit diagram showing another constitution of a magnetic head driving circuit according to the present invention.

Also, in the present driving circuit 10, a buffer capacitor $C_B$, which is to be a capacitor for amplifying the driving current supplied to the coil L, is connected in parallel with the coil L in an ac path. The buffer capacitor $C_B$ has its one terminal connected to one end of the coil L and has its other terminal grounded. Alternatively, the buffer capacitor $C_B$ may have its one terminal connected to one end of the coil L and the other terminal to the power source $V_C$, respectively, as shown in FIG. 7.

Figure 8:
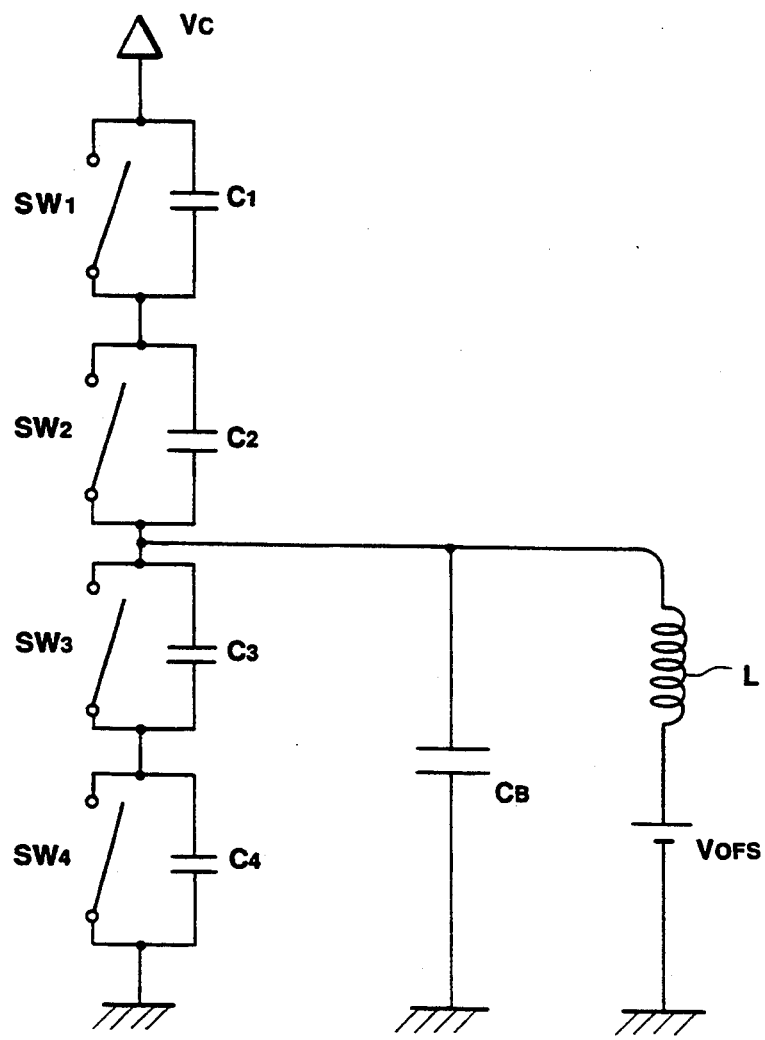
FIG. 8 is a circuit diagram showing an equivalent circuit of a magnetic head driving circuit shown in FIG. 6.

When shown as an equivalent circuit, the driving circuit 10 shown in FIG. 6 becomes a circuit having first to fourth capacitors $C_1$, $C_2$, $C_3$ and $C_4$, connected in series with the power source $V_C$, as shown in FIG. 8. First to fourth capacitors $C_1$, $C_2$, $C_3$ and $C_4$ are connected in parallel with the first to fourth switches $SW_1$, $SW_2$, $SW_3$ and $SW_4$ respectively.

In the equivalent circuit, shown in FIG. 8, the first capacitor $C_1$ and the first switch $SW_1$ correspond to the first switching element $FET_1$. The second capacitor $C_2$ and the second switch $SW_2$ correspond to the first diode $D_1$. The third capacitor $C_3$ and the third switch $SW_3$ correspond to the second diode $D_2$. Finally, the fourth capacitor $C_4$ and the fourth switch $SW_4$ correspond to the second switching element $FET_2$. That is, these first and second switching elements $FET_1$, $FET_2$ may be thought of as having feedback shunt capacitances and being operated as switches changed over between the turned-on and turned-off states in accordance with the recording signals. Thus the first and second switching elements $FET_1$, $FET_2$ are shorted when in the turned-on state, while being operated as feedback capacitances when in the turned-off state. On the other hand, the first and second diodes $D_1$, $D_2$ may be thought of as being switching elements switched between the turned-on state and the turned-off state depending on the voltage direction of gradients across capacitor terminals and hence as having parallel capacitances across the capacitor terminals, as in the case of the first and second switching elements $FET_1$, $FET_2$.

In the equivalent circuit, shown in FIG. 8, the magnetic field generating coil L has its one terminal connected to a junction line between the second and third capacitors $C_2$ and $C_3$, while having its other terminal connected to an offset voltage source $V_{OFS}$, which has its anode connected to the magnetic field generating coil L and has its cathode grounded. The buffer capacitor $C_B$ has its one terminal connected to one terminal of the coil L and has its other terminal grounded.

Figure 9:
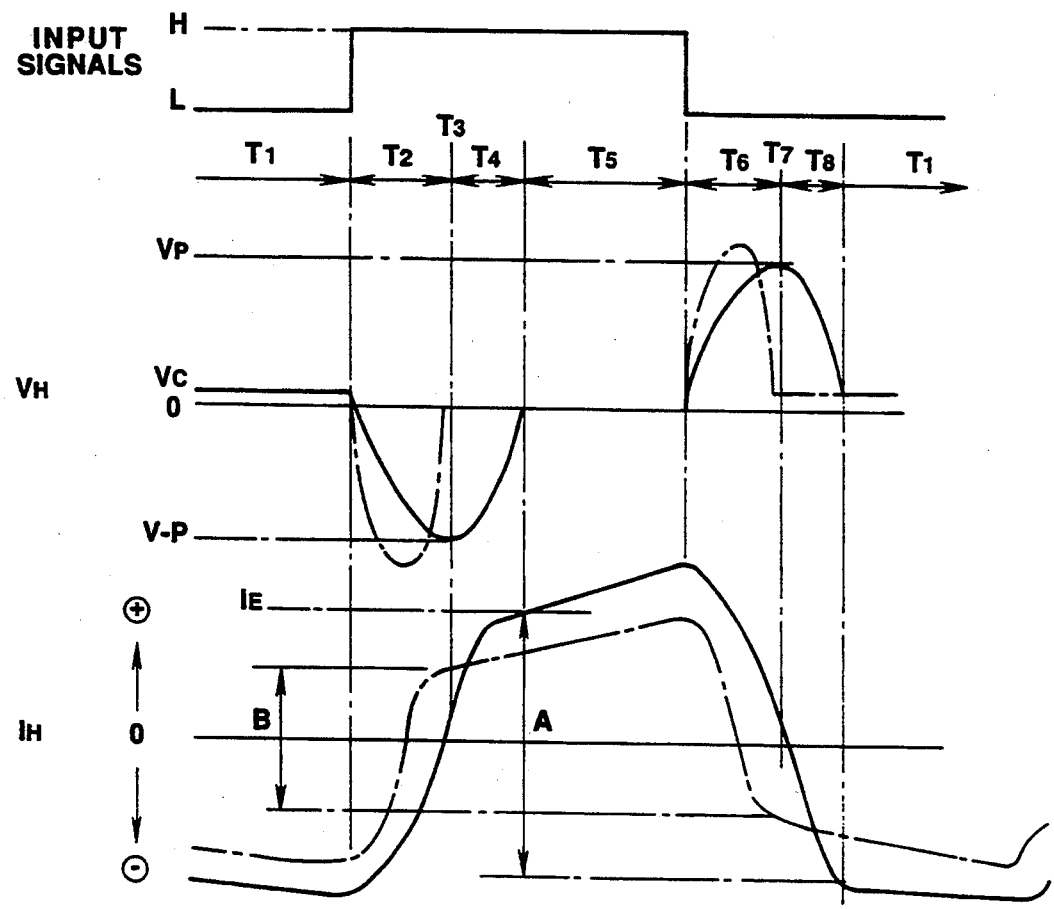
FIG. 9 is a timing chart for illustrating the relation between recording signals, electrical voltages applied across a magnetic field generating coil and the current flowing through the coil in the magnetic head driving circuit shown in FIG. 6.
Figure 10:
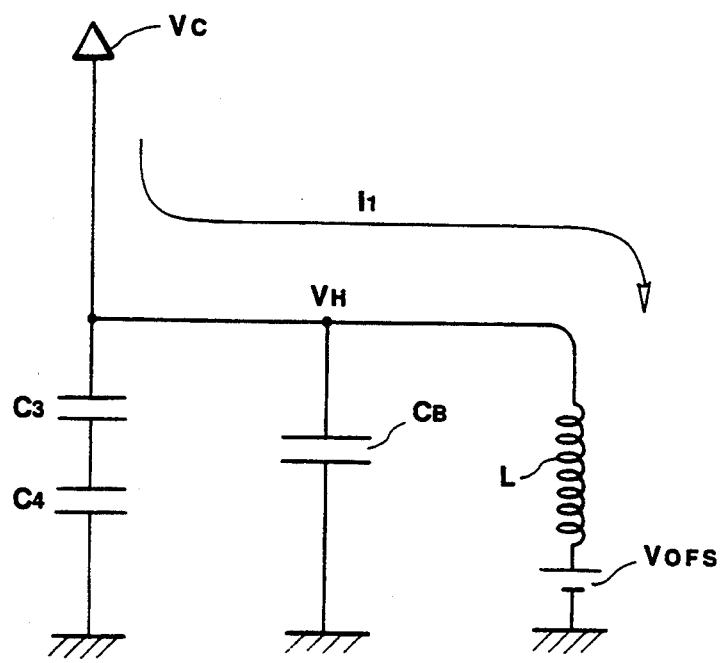
FIG. 10 is a circuit diagram showing an initial state in which the recording signal in the equivalent circuit of FIG. 8 is at an L level.

The operation of the driving circuit 10 is hereinafter explained by referring to the equivalent circuit sown in FIG. 8. In an initial state in which the recording signal shown at $T_1$ in FIG. 9 is at a low level L, the gate terminals of the first and second switching elements $FET_1$, $FET_2$ are at the L level. At this time, the first switching element $FET_1$ is turned on to render the first capacitor $C_1$ inoperative, while the second switching element $FET_2$ is turned off to render the fourth capacitor $C_4$ operative, as shown in FIG. 10. The first diode $D_1$ is forward biased and hence turned on so that the second capacitor $C_2$ is rendered inoperative. The second diode $D_2$ is reverse biased and hence turned off so that the third capacitor $C_3$ is rendered operative.

Meanwhile, the offset power source $V_{OFS}$ of the magnetic field generating coil L is connected alternately to power source $V_C$ and to ground via the magnetic field generating coil L. The proportions of the connecting time durations is constant at a cycle time width longer than a predetermined cycle time. For example, if the recording signals are modulated by EFM as used in the compact disc, the offset voltage has a switching rate of 10 μsec and the duty ratio of ½, so that the offset voltage is smoothed by the power source and proves to be a constant voltage source $V_{OFC}$.

Meanwhile, the voltage at a terminal of the magnetic field generating coil L is equal to the voltage of the power source $V_C$, if the sufficiently small threshold voltage is disregarded. Thus the voltages of the power source $V_C$ and the offset voltage source $V_{OFS}$ are applied to the coil L. Thus the driving current $I_H$ flows in a negative-going direction through the coil L from one terminal of the coil L towards the offset power source $V_{OFS}$, as shown by arrow $I_1$, with the current quantity being gradually increased in the negative-going direction. During the time the current flows in the above-described manner, the energy in the form of the magnetic flux is stored in the magnetic field generating coil L.

Figure 11:
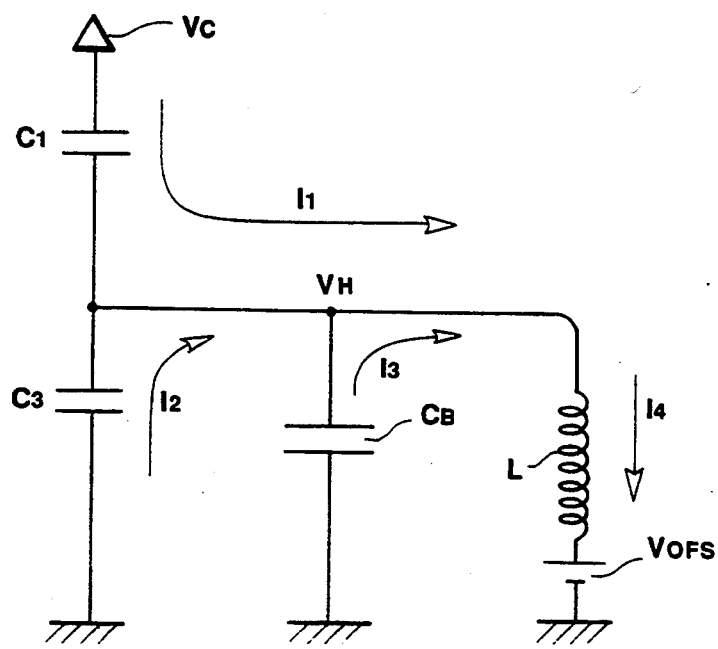
FIG. 11 is a circuit diagram showing the state in which the recording signal in the equivalent circuit of FIG. 8 goes high.

After the recording signal as shown at $T_2$ in FIG. 9 is inverted to an H level, the gate terminals of the first and second switching elements $FET_1$, $FET_2$ are at an H level, so that, in the equivalent circuit shown in FIG. 8, the first switching element $FET_1$ is turned off to render the first capacitor $C_1$ operative, while the second switching element $FET_2$ is turned on to render the fourth capacitor $C_4$ inoperative, as shown in FIG. 11. The states of the first and second capacitors $D_1$, $D_2$ are maintained. The coil L tends to cause the current to flow in the same direction as before by the energy stored as the magnetic flux. The electrical charges for maintaining the current are supplied to the first and third capacitors $C_1$, $C_3$ and to the buffer capacitor $C_B$, as shown by arrows $I_1$, $I_2$ and $I_3$ in FIG. 11, so that the voltage $V_H$ at one terminal of the magnetic field generating coil L is lowered. The driving current $I_H$ flowing through the coil L initially flows in the same direction as before, and is subsequently decreased gradually because of energy consumption due to charge migration.

Figure 12:
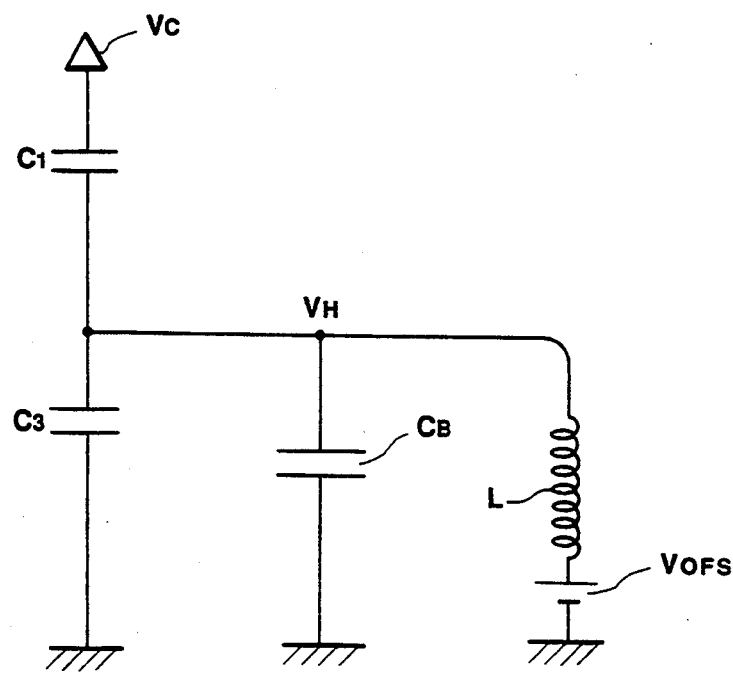
FIG. 12 is a circuit diagram showing the state when the energy of the magnetic field generating coil in the equivalent circuit of FIG. 8 is reduced to zero.

When the energy stored in coil L is dissipated and reduced to zero, the voltage $V_H$ at one end of the magnetic field generating coil L is decreased to a minimum value $V_{-p}$, as shown at $T_3$ in FIG. 9. In the equivalent circuit shown in FIG. 8, the driving current $I_H$ is reduced at this time to zero, as shown in FIG. 12. On the other hand, the maximum energies are stored in the first and third capacitors $C_1$, $C_3$ and in the buffer capacitor $C_B$. That is the energy equal to $C_1 \{V_c-(V-p)\}$ is stored in the first capacitor $C_1$. The energy equal to $C_B$ $(V-p)$ is stored in the buffer capacitor $C_B$. In these formulas, $C_1$, $C_3$ and $C_B$ are the capacitances of the first and third capacitors $C_1$ and $C_3$ and the buffer capacitor $C_B$, respectively.

Figure 13:
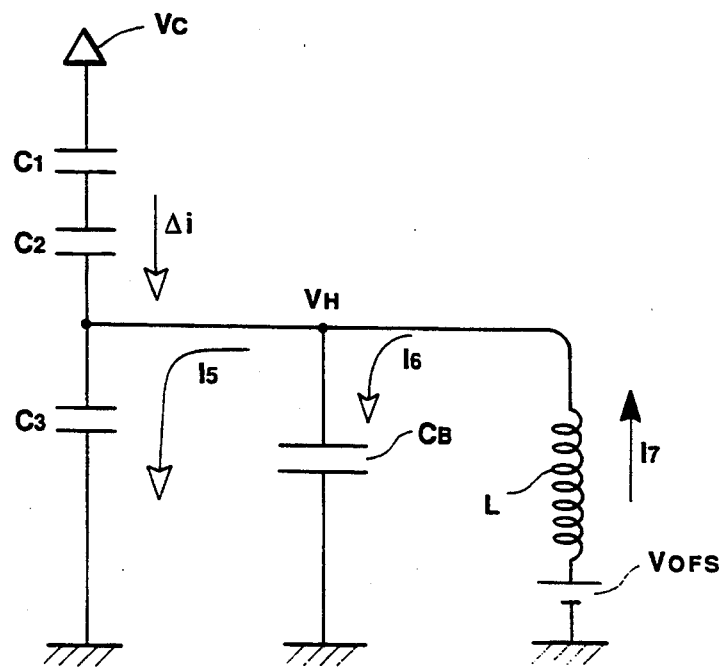
FIG. 13 is a circuit diagram, showing the state after the energy of the magnetic field generating coil in the equivalent circuit of FIG. 8 is reduced to zero.

Directly after a time instant when the energy stored in the magnetic field generating coil L is reduced to zero, the driving current $I_H$ is inverted to the positive-going direction, in accordance with a difference in electrical potential between the offset voltage $V_{OFS}$ and the minimum value $V_{-P}$ of the voltage $V_H$ at a terminal of the magnetic field generating coil L, as indicated by arrow $T_4$ in FIG. 9. Then, in the equivalent circuit, shown in FIG. 8, the first diode $D_1$ is turned off because the voltage across its terminals is inverted, so that the second capacitor $C_2$ comes into operation, as shown in FIG. 13. Therefore, it is the capacitances of the buffer capacitor $C_B$ and the third capacitor $C_3$ that are connected to the magnetic field generating coil L, so that, as shown by arrows $I_5$ and $I_6$ in FIG. 13, charge migration occurs from coil L towards the third capacitor $C_3$ and to buffer capacitor $C_B$. This charge migration, which produces the driving current in the magnetic field generating coil L, as shown by arrow $I_7$ in FIG. 13, is continued until the voltage $V_H$ at a terminal of the magnetic field generating coil L is decreased to the ground level.

Meanwhile, the current $\Delta i$, supplied from the second capacitor $C_2$, is a minute current and hence may be disregarded.

Figure 14:
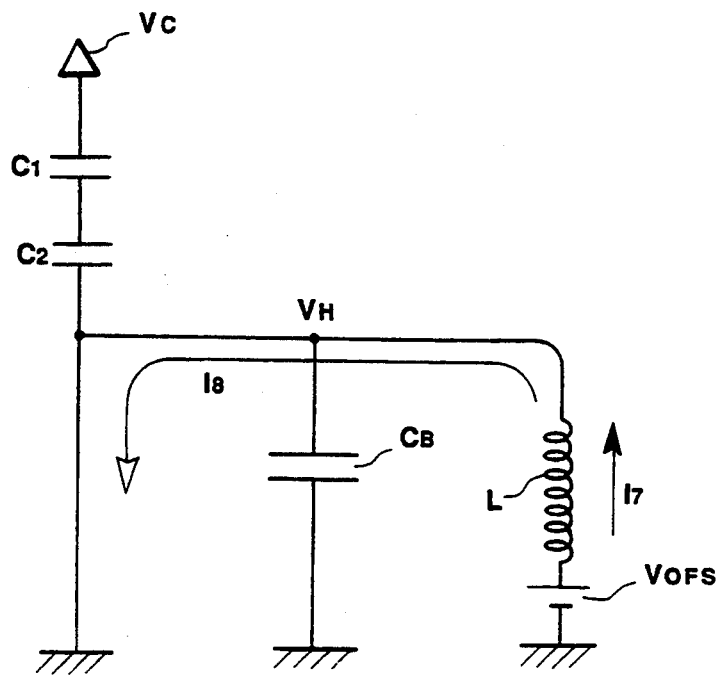
FIG. 14 is a circuit diagram showing the state when the energy of the magnetic field generating coil in the equivalent circuit of FIG. 8 is at a ground level.

During the time interval shown by arrow $T_5$ in FIG. 9, after the voltage $V_H$ at one terminal of the coil L is diminished to the ground level, the second diode $D_2$ is forwardly biased and hence turned on, so that the third capacitor $C_3$ in the equivalent circuit shown in FIG. 8 becomes inoperative, as shown in FIG. 14. Thus the voltage $V_H$ at the one terminal of the magnetic field generating coil L is fixed at the ground level. A voltage reaching the ground level from the offset voltage $V_{OFS}$ is applied across the magnetic field generating coil L, by the above-mentioned offset voltage $V_{OFS}$, so that the driving current $I_H$ is gradually increased in the positive-going direction, as indicated by arrows $I_7$ and $I_8$ in FIG. 14. At this time, energies are stored in the magnetic field generating coil L.

Considering the charge transfer to and from the magnetic field generating coil L, all of the energies initially stored in coil L are transiently supplied to the first and third capacitors $C_1$ and $C_3$ and to buffer capacitor $C_B$. Since the first diode $D_1$ is turned off to render the second capacitor $C_2$ operative, with the first capacitor $C_1$ being disconnected from the magnetic field generating coil L, it is only the energies from the third capacitor $C_3$ and buffer capacitor $C_B$ that are supplied from the capacitors $C_1$, $C_3$ and $C_B$ to the magnetic field generating coil L. Therefore, the effective current $I_E$ on inversion of the external magnetic field is related with the maximum value $I_{-P}$ of the driving current $I_H$ directly before inversion of the recording signal to H level by the following formula.

$$I_E = I_{-P}(C_3 + C_B)/(C_1 + C_3 + C_B) \quad (1)$$

When the buffer capacitor $C_B$ is not in circuit, the effective current $I_E$ is as follows:

$$I_E = I_{-P} C_3 / (C_1 + C_3) \quad (2)$$

It is seen that, since $(C_3 + C_B)/(C_1 + C_3 + C_B)$ is always larger than $C_3/(C_1 + C_3)$, the driving current $I_H$ is increased by the buffer capacitor $C_B$.

On the other hand, changes in the voltage $V_H$ at one terminal of the magnetic field generating coil L are such that the minimum value $V_{-P}$ is slightly larger and the time until reaching the ground potential is slightly longer, as shown by a solid line in FIG. 9, than when the buffer capacitor $C_B$ is not in circuit, as shown by a chain-dotted line in FIG. 9. The whereas changes in the driving current $I_H$ are such that the fluctuation amplitude is broader as indicated by a solid line and arrow A in FIG. 9 than when the buffer capacitor $C_B$ is not in circuit, as indicated by a chain-dotted line and arrow B in FIG. 9.

Figure 15:
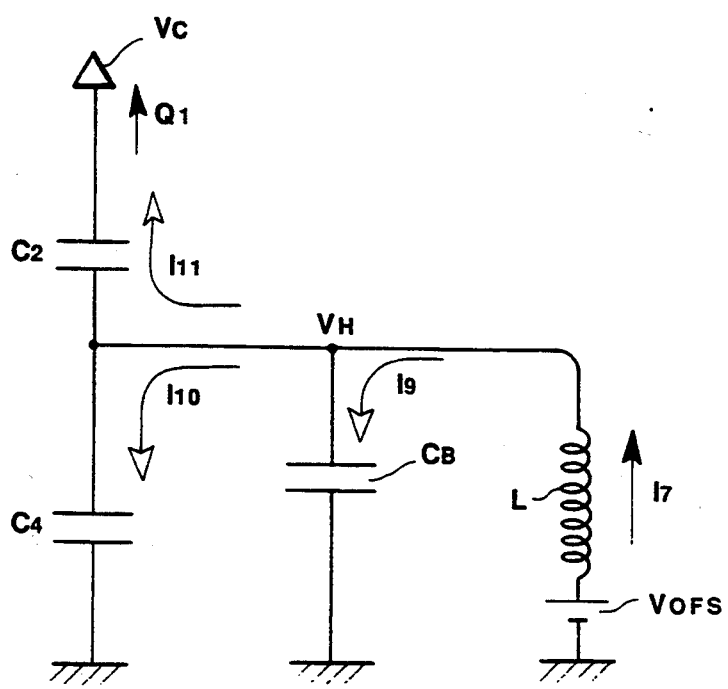
FIG. 15 is a circuit diagram showing the state when the recording signal in the equivalent circuit of FIG. 8 is at an L level.

When the recording signal is inverted to the L level, the gate voltages of the first and second switching elements $FET_1$ and $FET_2$ are at L level, so that, in the equivalent circuit, shown in FIG. 8, the first switching element $FET_1$ is turned on to render the first capacitor $C_1$ inoperative, while the second switching element $FET_2$ is turned off to render the fourth capacitor $C_4$ operative, as shown in FIG. 15. After the recording signal is inverted to the L level, as indicated by arrow $T_6$ in FIG. 9, electric charges stored in coil L are transferred to second and fourth capacitors $C_2$, $C_4$ and to buffer capacitor $C_B$, as indicated by arrows $I_9$, $I_{10}$ and $I_{11}$ in FIG. 15. At this time, the driving current $I_H$ is flowing in the positive-going direction through the magnetic field generating coil L, as indicated by arrow $I_7$ in FIG. 15, while the voltage $V_H$ at one terminal of the magnetic field generating coil L is increased.

Figure 16:
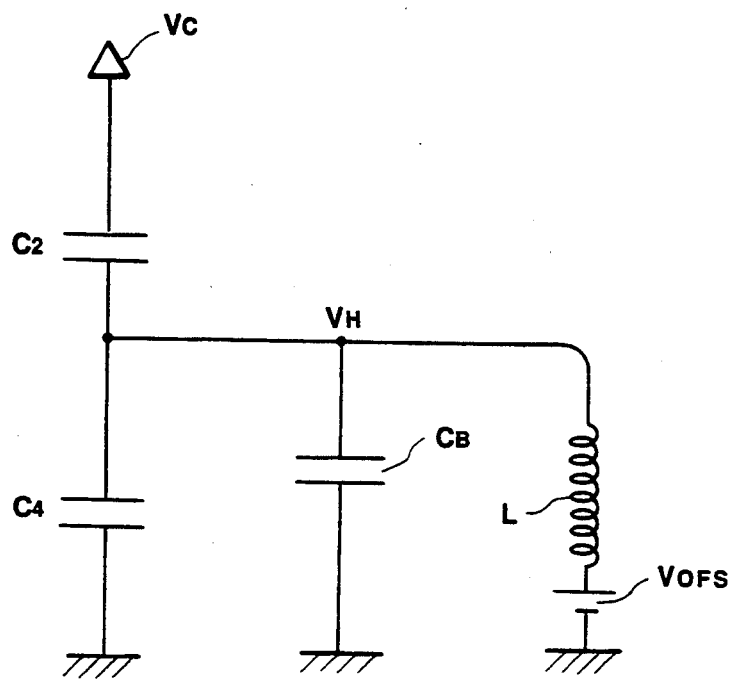
FIG. 16 is a circuit diagram showing the state when, after the recording signal in the equivalent circuit of FIG. 8 has gone low, the energy in the magnetic field generating coil is reduced to zero.

When the energy stored in the magnetic field generating coil L is reduced to zero, as indicated at $T_7$ in FIG. 9, the driving current $I_H$ becomes zero, as shown in FIGS. 16 and 9, while the voltage $V_H$ at one terminal of the magnetic field generating coil L reaches a maximum value $V_P$. Thus the maximum energies are stored in the second and fourth capacitors $C_2$, $C_4$ and in the buffer capacitor $C_B$. That is, the energy equal to $C_2(V_P - V_C)$ is stored in the second capacitor $C_2$, while the energies equal to $C_4 V_P$ and $C_B V_P$ are stored in the fourth capacitor $C_4$ and buffer capacitor $C_B$, respectively. In these formulas, $C_2$, $C_4$ are the capacitances of the second and fourth capacitors $C_2$, $C_4$, respectively. On the other hand, a voltage equal to $(V_P - V_{OFC})$ is applied across both terminals of the magnetic field generating coil L.

Figure 17:
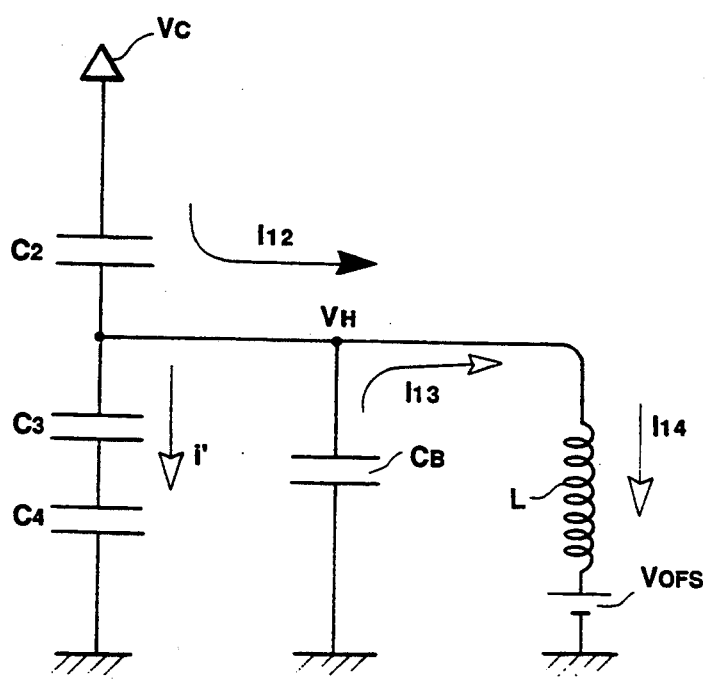
FIG. 17 is a circuit diagram showing the state when, after the recording signal in the equivalent circuit of FIG. 8 has gone low, the current in a reverse direction starts to flow in the magnetic field generating coil.

During a time interval after the energy stored in coil L is reduced to zero, as indicated by arrow $T_8$ in FIG. 9, charge transfer is incurred by the voltage applied across the magnetic field generating coil L in a direction from the second capacitor $C_2$ and buffer capacitor $C_B$ towards the magnetic field generating coil L, as indicated by arrows $I_{12}$, $I_{13}$ in FIG. 17. That is, the driving current $I_H$ is the negative-going current, as indicated by arrow $I_{14}$ in FIG. 17. In the equivalent circuit, shown in FIG. 8, since the second diode $D_2$ is reverse biased and hence is turned off, third capacitor $C_3$ becomes operative. Thus the fourth capacitor $C_4$ is isolated from coil L, while retaining electrical charges. As a result of charge transfer from second capacitor $C_2$ towards coil L, third capacitor $C_3$ delivers a current $\Delta i'$ indicated by arrow i' in FIG. 17. This current $\Delta i'$, however, is minute and hence negligible.

As a consequence of the charge transfer from second capacitor $C_2$ towards coil L, the voltage $V_H$ at the one terminal of coil L is lowered and becomes equal to the offset voltage $V_{OFS}$. When the voltage $V_H$ is equal to the offset voltage $V_{OFS}$, the first diode $D_1$ in the equivalent circuit shown in FIG. 8 is forward biased and hence turned on to render the second capacitor $C_2$ inoperative. This state is the initial state indicated by arrow $T_1$ in FIG. 9, as explained by referring to FIG. 10. Meanwhile, the charges stored in the fourth capacitor $C_4$ are released to a ground terminal.

Therefore, the effective current $I_{-E}$ on inversion of the recording signal to the L level is related with the maximum value $I_p$ of the driving current $I_H$ directly before inversion of the recording signal to H level by the following formula:

$$I_{-E} = I_P(C_2+C_B)/(C_2+C_4+C_B) \quad (3)$$

When the buffer capacitor $C_B$ is not in circuit, the effective current $I_{-E}$ is as follows:

$$I_E = I_P C_2/(C_2+C_4) \quad (4)$$

It is seen that, since $(C_2+C_B)/(C_2+C_4+C_B)$ is always larger than $C_2/(C_2+C_4)$, the driving current $I_H$ is increased by the buffer capacitor $C_B$.

On the other hand, changes in the voltage $V_H$ at one terminal of the magnetic field generating coil L are such that the maximum value $V_P$ is slightly less and the time until reaching the source potential $V_C$ is slightly longer, as shown by a chain-dotted line in FIG. 9, than when the buffer capacitor $C_B$ is not in circuit, as shown by a chain-dotted line in FIG. 9.

Meanwhile, if the recording signal is a 2 MHz signal, and the inductance of coil L is 6 μH, the capacitance of the buffer capacitor $C_B$ is preferably set so that the sum of the capacitances of the third and fourth capacitors $C_3$, $C_4$ of the equivalent circuit shown in FIG. 8 is equal to 26 pf. That is, if the recording signal is a 2 MHz signal, the frequency shown by $f = 1/\{2\pi(C_T \cdot L)^{(\frac{1}{2})}\}$ is equal to 4 to 5 MHz. In this formula $C_T$ is the sum of the capacitances of the third and fourth capacitors $C_3$, $C_4$ and the buffer capacitor $C_B$ and L is the inductance of the magnetic field generating coil L. From this formula, the capacitance $C_T$ is approximately 26 pf. Since the sum of the capacitances $C_3$, $C_4$ is on the order of 10 pf, an optimum value of the capacitance of the buffer capacitor $C_B$ is on the order of 16 pf.

The first and second limiting resistors $R_1$, $R_2$ of the above-mentioned driving circuit 10 limit the time rate of charging to the capacitors $C_1$, $C_2$, $C_3$, $C_4$ and $C_B$ in the equivalent circuit shown in FIG. 8 for inhibiting any adverse effects which the errors in characteristics of electronic elements of the driving circuit 10 might have on the characteristics of the driving circuit 10. Besides, the buffer capacitor $C_B$ not only amplifies the driving current $I_H$ but also inhibits adverse effects which the errors in characteristics of electronic elements of the driving circuit 10 might have on the characteristics of the driving circuit 10.

Referring to the drawings, an embodiment of a magnetic head device driven by the above-described magnetic head driving circuit is explained.

Figure 18:
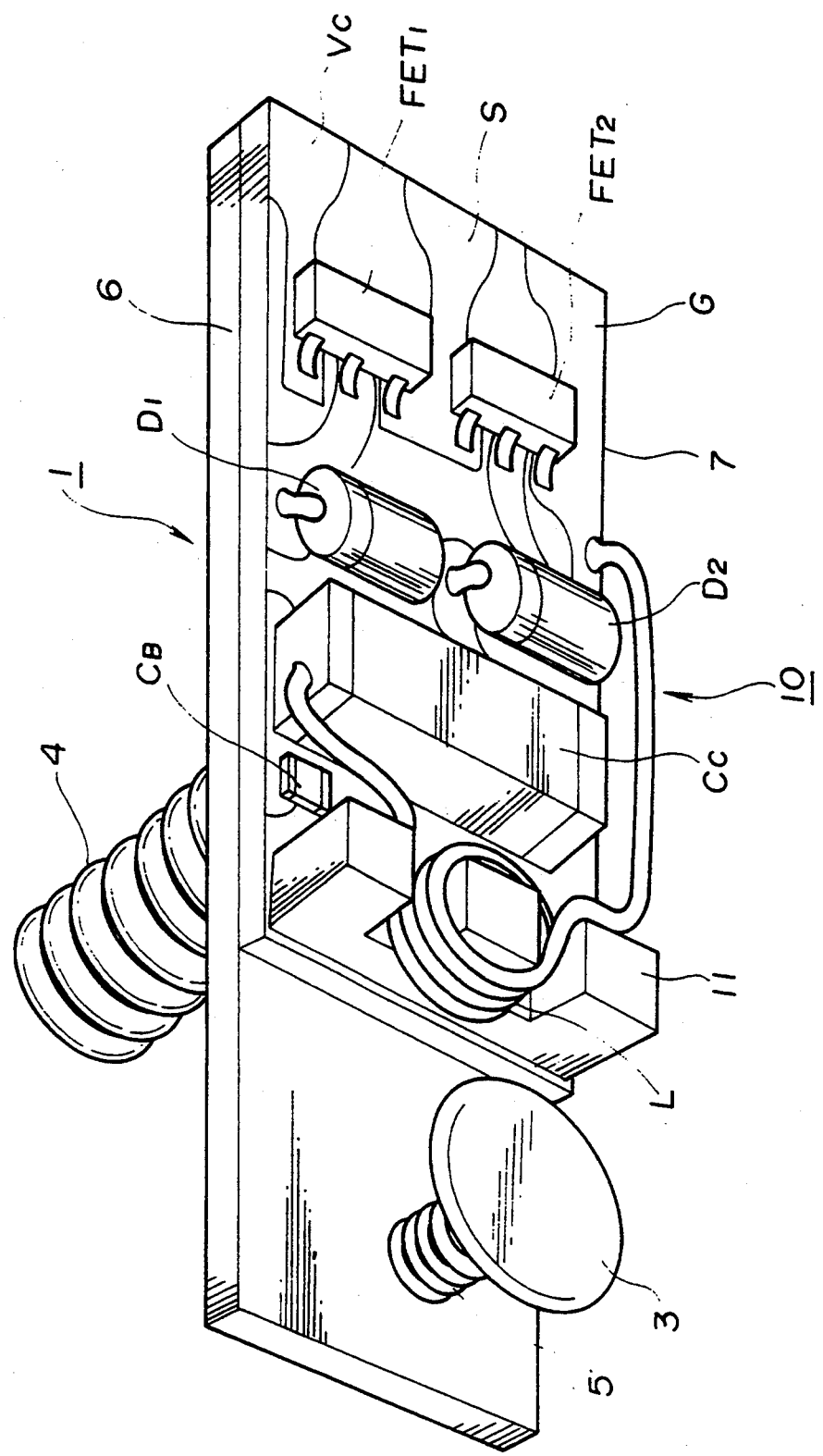
FIG. 18 is an enlarged perspective view showing the constitution of a magnetic head device according to the present invention.

The magnetic head device according to the present invention comprises a substrate 7 as a circuit part consisting in a printed circuit board, as shown in FIGS. 4 and 18. The substrate 7 is attached to a magnetic head supporting base plate 6.

The magnetic field generating coil L and the driving circuit 10 connected to the coil L are arranged on the substrate 7, as shown in FIGS. 5 and 18. The coil L comprises a magnetic core 11 mounted on the substrate 7 and a conductor wound on the core 11. The magnetic core 11 is formed of a magnetic material, such as ferrite, exhibiting high magnetic permeability. The driving circuit 10 is constituted by connecting plural electronic elements to a circuit pattern provided on the substrate 7. The driving circuit 10 is supplied with recording signals, as information signals to be recorded on the magneto-optical disc 101. The information signals are for controlling the driving current $I_H$ in accordance with the recording signals and for modulating the external magnetic field.

The driving circuit 10 comprises first and second switching elements $FET_1$, $FET_2$, as shown in FIGS. 6 and 18. Each of the first and second switching elements $FET_1$, $FET_2$ has its gate terminal connected to an input terminal pattern S which is formed on the substrate 7 and to which the recording signal are entered via a jumper wire, not shown.

The first switching element $FET_1$ has its drain terminal connected via a first limiting resistor $R_1$ to a power source pattern $V_C$ to which a power source $V_C$ is supplied via a jumper wire, not shown. The second switching element $FET_2$ has its source terminal connected via a second limiting resistor $R_2$ to a grounding pattern G which is grounded via a jumper wire, not shown.

In the driving circuit 10, the magnetic field generating coil L has its one terminal connected to a junction line between the first and second diodes $D_1$, $D_2$ via a coupling capacitor $C_C$, while having its other terminal connected to the grounding pattern G.

The operation of the driving circuit 10 is the same as that explained with reference to FIGS. 8 to 17 and is not repeated herein to avoid redundancy.

With the above-described magnetic head device, since the magnetic field generating coil L and the driving circuit 10 are integrated on the substrate 7, the recording apparatus may be reduced in size and simplified in construction. Besides, since the inter connection between coil L and driving circuit 10 may be reduced in length, electrical resistance or stray capacitances of the interconnection may be diminished for improving the magnetic field generating efficiency and characteristics.

Figure 19:
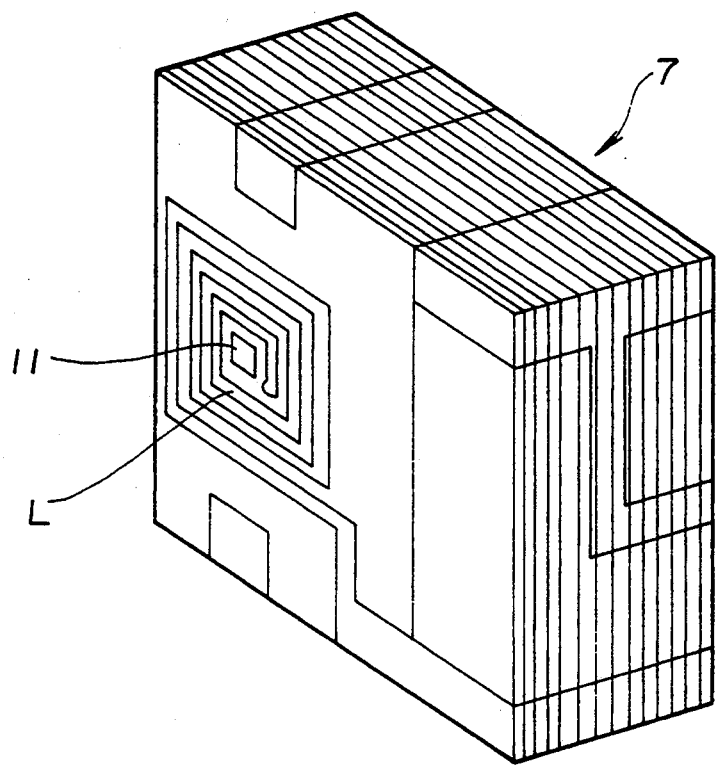
FIG. 19 is an enlarged perspective view showing another example of the constitution of a magnetic head device according to the present invention.
Figure 20:
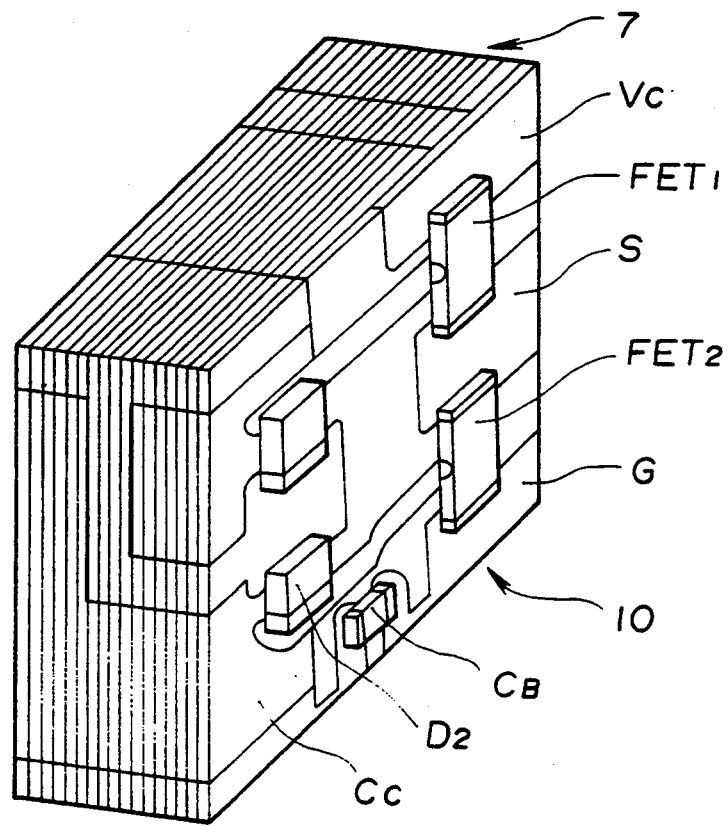
FIG. 20 is an enlarged perspective view, looking from another viewing direction, of the magnetic head device shown in FIG. 19.
Figure 21:
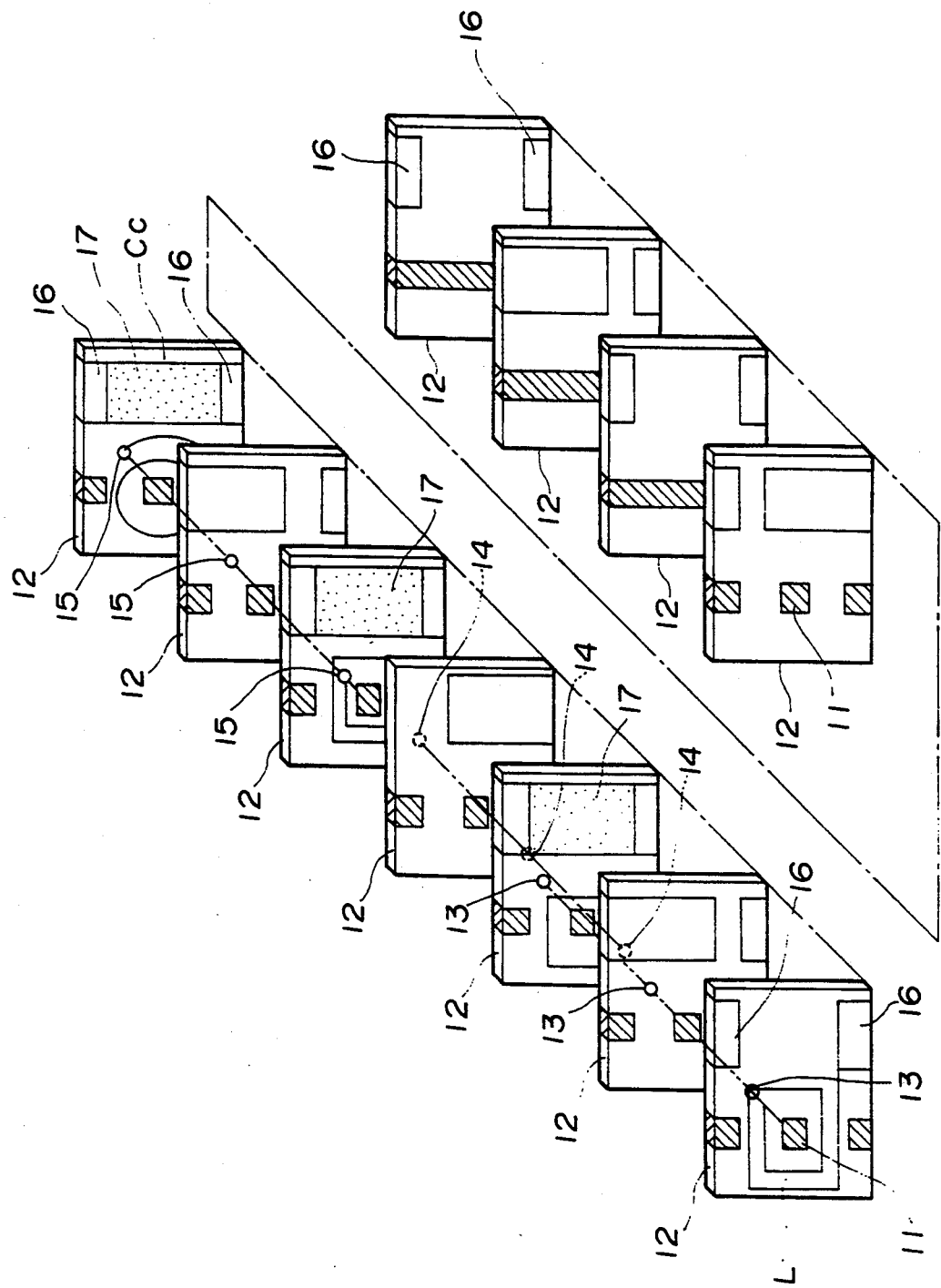
FIG. 21 is an exploded perspective view showing the constitution of the magnetic head device shown in FIG. 19.

The magnetic head device according to the present invention may be constituted by stacking plural ceramic thin sheets 12, as shown in FIGS. 19 to 21, without being limited to the above-described embodiment.

Each of the ceramic thin sheets 12, making up the substrate 7, has embedded therein a magnetic material constituting the magnetic core 11, a conductor material constituting an interconnection pattern, a spirally-shaped conductor material, constituting the magnetic field generating coil L, a conductor material 16 constituting the coupling capacitor $C_C$ and a dielectric material 17, as shown in FIG. 21. Each ceramic thin sheet 12 also has through-holes 13, 14, 15 for providing connection between the spirally-shaped conductor materials constituting the magnetic field generating coil L.

The ceramic thin sheets 12 are stacked and sintered together to form a pillar-shaped magnetic core part 11, the magnetic field generating coil L wound around the core part 11, the coupling capacitor $C_C$ and the interconnection pattern, as shown in FIGS. 19 and 20. The magnetic field generating coil L is constituted by the spirally-shaped conductor materials connected via through-holes 13, 14, 15. The coupling capacitor $C_C$ has a conductor sheet integrated to the conductor material 16 which is to be an electrode part at one end, a dielectric member 17 and a conductor sheet integrated to the conductor material 16 as the electrode part at the other end. That is, the electrode parts of the coupling capacitor $C_C$ are comb-shaped with the comb teeth being alternately engaged with one another via the dielectric material 17. The interconnection pattern is constituted by the conductor materials facing the outer lateral sides of the substrate 7 formed by the thin ceramic sheets 12 for providing connection between the magnetic field generating coil L and the coupling capacitor $C_C$ while providing predetermined pattern of the power source pattern $V_C$, input terminal pattern S or the grounding pattern G.

The first and second switching elements $FET_1$, $FET_2$, first and second diodes $D_1$, $D_2$ and buffer capacitor $C_B$, formed as chip components, are mounted on the substrate 7, constituted by plural ceramic thin sheets 12, as shown in FIG. 20. These chip components are soldered on the interconnection pattern formed on the substrate 7. The first and second switching elements $FET_1$, $FET_2$, first and second diodes $D_1$, $D_2$, buffer capacitor $C_B$, magnetic field generating coil L and the coupling capacitor $C_C$ make up the driving circuit 10 having the circuit configuration shown in FIG. 6 via the interconnection pattern. That is, the power source $V_C$ is connected to the power source pattern $V_C$ via a jumper wire, not shown. The recording signals are inputted to the power source pattern S via a jumper wire, not shown. The grounding pattern G is grounded via a jumper wire, not shown.

The magnetic head device having the substrate 7 constituted by plural ceramic thin sheets 12 stacked together to form the driving circuit 10 is attached to the head support 6 in the recording apparatus so as to be used as external magnetic field application means for applying the external magnetic field to the magneto-optical disc 101.

With the above-described magnetic head driving circuit according to the present invention, the capacitor for amplifying the driving current, connected in parallel to the magnetic field generating coil in an ac path stores the energy of the recording signals to release the energy at the time of inversion of the recording signals. The result is that, with the present magnetic head driving circuit, the driving current supplied to the magnetic field generating coil is amplified by the capacitor for augmenting the magnetic field generated by the magnetic field generating coil.

With the magnetic head device according to the present invention, the magnetic core Carrying the magnetic field generating coil and the driving circuit for supplying the driving current corresponding to the recording signals to the magnetic field generating coil are both supported on the printed circuit board. Consequently, with the recording apparatus making use of the magnetic head device, there is no necessity of providing the magnetic head driving circuit separately from the magnetic head device, so that the arrangement may be simplified and reduced in size.

Besides, since the interconnection between the magnetic field generating coil and the driving circuit is of a shorter length, electrical resistance or stray capacitances of the interconnection are small so that the magnetic field generating efficiency and characteristics may be improved.

In this manner the present invention provides a magnetic head device which is simplified in structure and reduced in size and is capable of generating a sufficiently strong magnetic field by integration of the magnetic head driving circuit.

What is claimed is:

1. A magnetic head device for recording information signals on a magneto-optical disc by application of a magnetic field on a signal recording layer thereof, comprising:
    a magnetic core;
    a substrate for supporting said magnetic core wherein said substrate comprises plural ceramic sheets stacked together;
    a magnetic field generating coil wound about said magnetic core and supplied with a driving current for generating a magnetic field; and
    a driving circuit provided integrally with said magnetic field generating coil on said substrate, said driving circuit including a switching element supplied with input recording signals and being turned on and off in accordance with said recording signals, a rectifier connected in series with said switching element, and an amplifying capacitor connected in parallel with said magnetic field generating coil in an ac path for amplifying said driving current supplied to said magnetic field generating coil, said driving circuit supplying a driving current corresponding to said recording signals to said magnetic field generating coil.

2. The magnetic head device as defined in claim 1, wherein said switching element comprises a first switching element and a second switching element for performing a push-pull operation in accordance with said recording signals, and wherein said rectifier comprises first and second rectifiers connected in series between said first and second switching elements.

3. The magnetic head device as defined in claim 1, wherein said magnetic field generating coil has one terminal connected to a junction between said first and second rectifiers via a coupling capacitor and has a second terminal grounded.

4. A magnetic head device, comprising:
    a magnetic head supporting base plate;
    a slider connected to said magnetic head supporting base plate via a damper spring, said slider maintaining contact with a magneto-optical disc;
    a substrate attached to said magnetic head supporting base plate;
    a magnetic field generating coil connected to said substrate for generating magnetic fields; and
    a magnetic field driving circuit for supplying said magnetic field generating coil with driving currents corresponding to information signals;
    wherein said slider maintains a predetermined distance between said magnetic field generating coil and said magneto-optical disc and wherein said magnetic field driving circuit is small in size.

5. A magnetic head device as defined in claim 4, wherein said driving circuit comprises:
    a pair of switching elements for performing a push-pull operation in accordance with said information signals;
    a pair of rectifiers connected in series with each other between said switching elements;
    said magnetic field generating coil having one terminal connected to a junction line between said rectifiers via a coupling capacitor and having a second terminal grounded; and
    an amplifier capacitance connected in parallel with said magnetic field generating coil in an ac path for amplifying said driving currents supplied to said magnetic field generating coil.

6. A magnetic head device for recording information signals on a magneto-optical disc by application of a magnetic field on a signal recording layer thereof, comprising:

a plurality of ceramic thin sheets;

a magnetic core formed in each of said ceramic thin sheets;

a conductive path formed in each of said ceramic thin sheets;

wherein said plurality of ceramic thin sheets are stacked together linking together the conductive path formed in each of said ceramic thin sheets to thereby form a magnetic field generating coil and a driving circuit for said magnetic field generating coil is attached to a ceramic thin sheet on the top of the stacked sheets.

7. A magnetic head device as defined in claim 6, wherein said driving circuit comprises:

a pair of FETs for performing a push-pull operation in accordance with information signals;

a pair of diodes connected in series with each other between said FETs;

said magnetic field generating coil having one terminal connected to a junction line between said diodes via a coupling capacitor on said top sheet and having a second terminal grounded; and an amplifier capacitance connected in parallel with said magnetic field generating coil in an ac path for amplifying driving currents supplied to said magnetic field generating coil.

8. The magnetic head device as defined in claim 7, wherein said coupling capacitor is formed in said plurality of ceramic thin sheets by placing a dielectric material in some of said plurality of ceramic thin sheets in an opposing relationship to a conductive material placed on other of said plurality of ceramic thin sheets.

9. A magnetic head device as defined in claim 1, further comprising an optical pickup device facing said magnetic head device with an magneto-optical disc in-between, said optical pickup device radiating a light beam to said magneto-optical disc.

* * * * *